3,346,818
TELEMETERING CIRCUITS AND AMPLIFIERS EMPLOYED THEREIN
John F. Price, Van Nuys, Calif., assignor to Statham Instruments, Inc., Los Angeles, Calif., a corporation of California
Filed Nov. 12, 1963, Ser. No. 322,835
8 Claims. (Cl. 330—30)

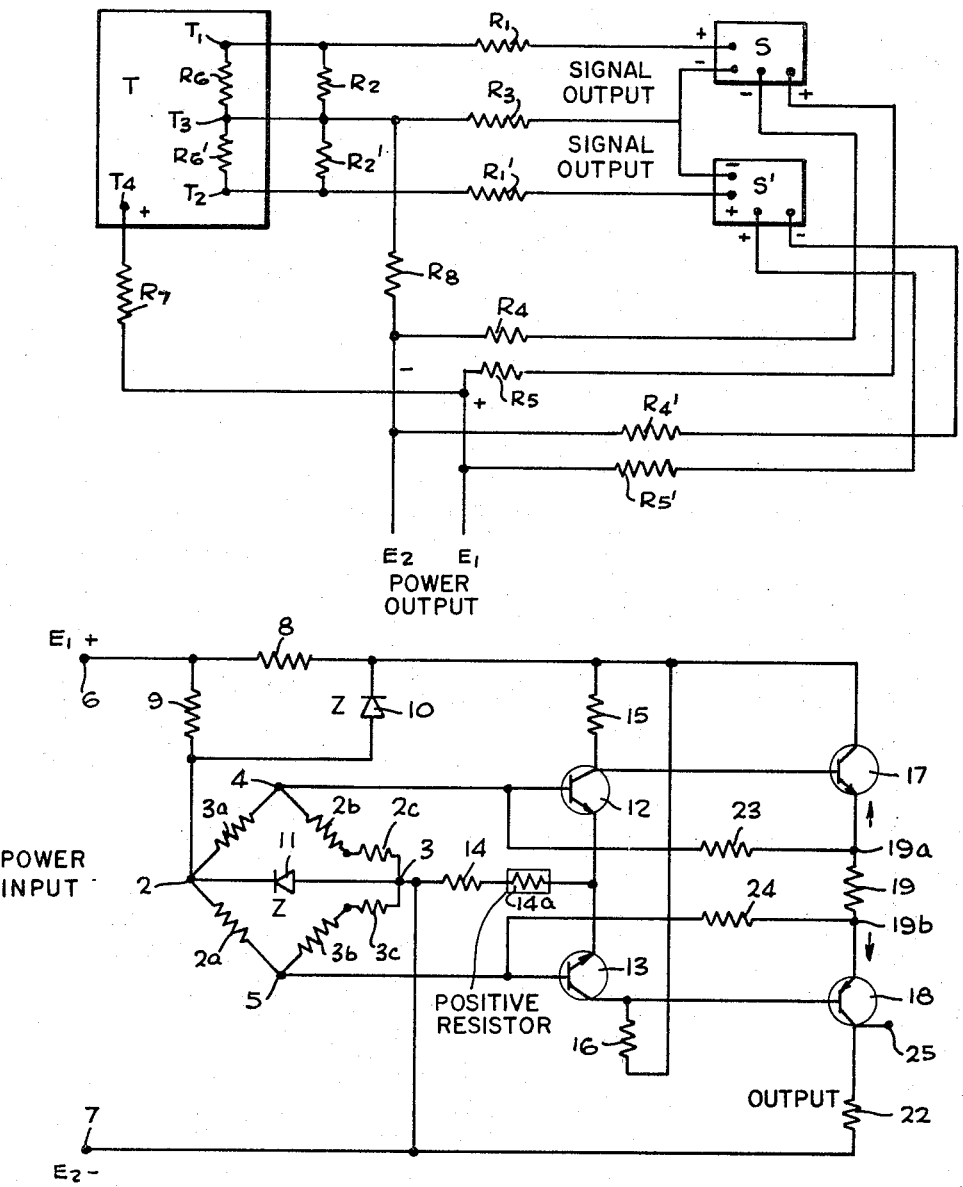

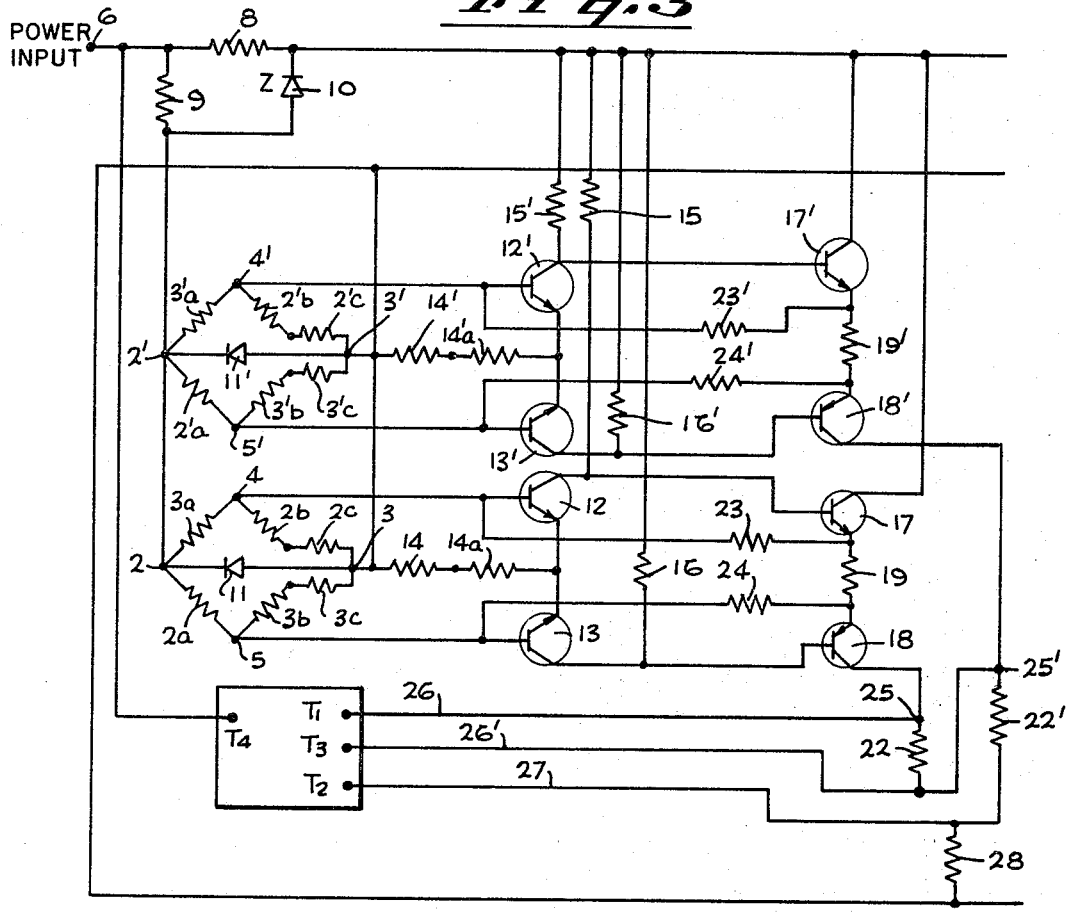
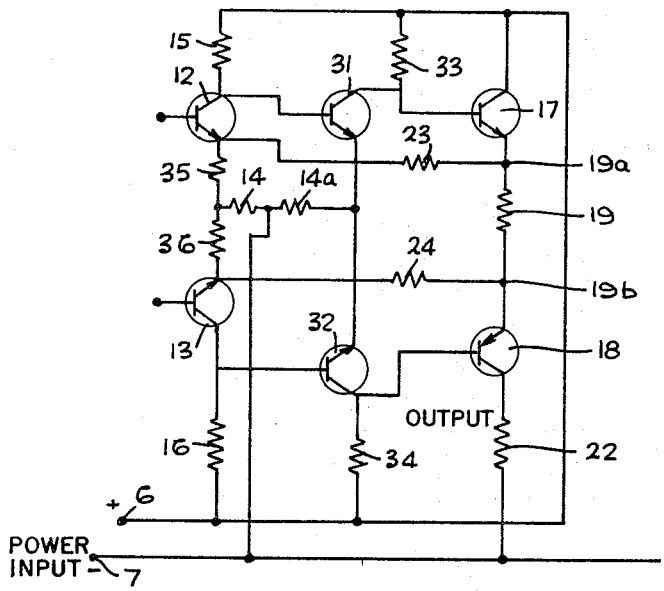

This application is a continuation-in-part of application Ser. No. 275,848, filed Apr. 26, 1963, now abandoned.

This invention relates to telemetering circuits, and particularly telemetering circuits connected to several signal sources, for example, although not necessary, those produced from transducers whose sensing element develops an electrical signal. In many such transducers, both of the output terminals of the signal generating elements are above ground potential, and thus are said to be double-ended output terminals. In such cases, the outputs of the several signal sources are not referenced to the same reference potential. For many telemetering purposes, when the response elements may receive signals from various signal sources, it is desirable that all of the signals be referenced to a common reference potential, for example, ground potential. Such signal sources are said to be single-ended.

It is frequently necessary for the above reasons, in telemetering systems employing multiple signal sources to isolate the output signal from the power source. Methods of voltage isolation introduce severe problems and added costs. Voltage isolators employing magnetic or reactive components are not sufficiently effective at cryogenic temperatures and are bulky and costly.

In the telemetering circuit of my invention, I generate a single-ended ouput signal whose signal parameter is a current which is a function solely of the input stimulus to the signal generating means and is isolated from all other currents in the signal generating means. The current is returned to the power source through paths which do not include the lines connecting the signal source to the response elements of the telemetering circuit, nor does this return path include the power lines which connect the signal source to power source employed as the signal excitation source.

In the signal sources employing direct-coupled differential amplifiers to amplify weak signals, the output signal is affected by changes in the current in the amplifier circuit which result from influences other than variations in the input signal to the amplifier. This introduces an error in the system so that the response systems will not receive a reliable signal which is a true indication of the transducer output signal.

In the system of my invention, the voltage drops in the lines connecting the signal source to the response circuits and in the power lines are not added or subtracted from the signal voltage generated by the signal-generating means. Thus, the intelligence developed by the transducer appearing as current at the response elements of the telemetering circuit is not affected by voltage drops in the connecting lines or the power lines. The conversion of the current parameter of the signal to a voltage may be accomplished at low power levels and at as low or high voltages as desired. This permits the use of solid-state elements in the signal-generating means that have high performance characteristics at cryogenic temperatures.

It is an object of my invention to produce an electrical output signal whose current parameter is isolated from other currents in the signal-generating means and which would affect the output current in a random or other manner not necessarily dependent on the input stimulus.

It is a further object of my invention to return the signal current to the excitation source which powers the signal means, through paths which do not include the conductors which connect the signal source to the response element of the telemetering circuit which respond to the applied signal.

In many services where a weak signal is derived and must be amplified, where such signal is a DC signal or a signal of sufficiently low frequency to be suitable, amplification by direct-coupled amplifiers known as DC amplifiers is a convenient means of amplification. The outputs of such amplifiers are frequently double-ended. Such amplifiers may be single-ended by referencing one of the outputs to a base potential through a voltage translation network.

The current and voltage output of the other output terminal known as the live or active terminal is, however, particularly in transistorized or other solid-state amplifiers, strongly influenced by variations of impedance in the current paths in the amplifiers, even though the excitation voltage is maintained constant.

It is thus another object of my invention to amplify a weak DC or low-frequency signal to produce an amplified signal referenced to a reference potential.

It is a further object of my invention to derive an output signal whose current parameter is independent of, i.e., is isolated from any other currents in the amplifier circuit, when the excitation voltage for the amplifier is maintained substantially constant.

In such cases, the current parameter of the single-ended output signal is proportional to the input stimulus to which the signal current in the circuit of my invention is responsive.

In the preferred embodiment of my invention, I employ a differential transistorized amplifier of at least two stages in which the first stage consists of a pair of transistors of common characteristics acting as a driver stage. The driver transistors are connected to a pair of complementary transisitors acting as an inverter to provide for a single ended output signal which is referenced to ground or other reference potential. The emitters of the complementary transistors are connected to a common load resistor across which the amplified signal is developed. The collector of one of the complementary transistors is connected to the negative terminal of the reference potential through a passive resistor. The output signal developed on this resistance is thus made single ended.

In such system the collector-to-emitter currents in the complementary transistors are each added in the common load resistor and the value of the current is dependent solely on the value of the amplified signal voltage applied to the common load resistor. The current through the common load resistor, the excitation voltage for the amplifier being held substantially constant, is thus independent of the currents in the other circuit paths of the amplifier, e.g. in the stages preceding the final complementary stage.

I employ a translation network to translate the differential potential developed across the common load resistor to a potential which is developed across another resistor which has one of its terminals connected to ground or other reference. The translation network includes a passive resistor whose value is fixed and preferably is substantially constant with temperature changes. The output voltage is developed across this passive resistor.

In such a construction, the current parameter of the output signal developed across the common load resistor is substantially indepedent of the load impedances, and thus of the variation in impedance of any telemetry lines and in recording or other telemetry circuits.

A feature of my invention is the application of temperature compensation. This is particularly useful as an aid in extending the temperature extremes within which the above system is operable. The effect of temperature variation on the construction is as follows:

If the transistors of the system are properly biased at a given temperature and the system is exposed to another temperature, the base to emitter bias of the transistors is changed. This results in a cutoff or saturated condition of the transistor for even moderate temperature changes i.e., 100° F.

It is one of the features of the circuit of this application that the base-to-emitter voltage of the transistors of the differential amplifier is maintained at the proper operating level over a wide range of temperatures. The result is that the collector voltage of the driver stage for a given signal level to the differential amplifier is maintained substantially constant over this same wide range of ambient temperature.

The signal current or any voltage equivalent thereto may be applied to any response element of a telemetry circuit, for example, such as a recorder or a command (or response) function of the telemetry circuit by employing the circuit of my invention described above. All such telemetry elements are herein referred to as response elements. The signal current is returned to the power source through a current path which does not include the lines connecting the response elements to the signal source nor the power lines which connect the excitation source to the signal source to power the signal source.

The circuit of my invention has a number of important advantages. The parameter of the output signal which is made responsive to the input stimulus is a current which is returned through an isolated current path. It permits translation to a voltage referenced to a reference potential, by insertion of a resistor in the current path to the reference potential. This readout voltage is dependent only on the amplified differential signal voltage at the common load resistor so long as the excitation voltage of the DC amplifier is maintained substantially constant and so long as the common load resistance remains substantially constant.

Current in the translation network is independent of the impedances of the complementary transistors when employing total feedback as shown in FIGURE 3, and is thus not affected by temperature changes which affect the impedance of the transistors nor require a matching of the complementary transistors.

Since the output current through the translation network is made independent of the load connected to the translation network, my circuit is compatible with various type of recorders and telemetry circuits operating with various signal sources without compromising the linear relationship between the input stimulus and the resultant current in the translation resistor.

The system is thus a voltage-to-current translator which is independent of the output impedance.

Another important advantage of the current-isolation, voltage-translation amplifier circuit of my invention is that many signal sources are connected to telemetry circuits which have common response elements connected to several signal sources. Also the signals received by the common response elements are each independent of each other and independent of any changes in the impedance of circuit loops in the connecting power lines, in the connecting telemetry lines and in the response elements. These and other objects of my invention will be further described by reference to the accompanying drawings of which FIGURE 1 shows a generalized telemetry system which is suitable for any single-ended system employing current isolation;

FIGURE 2 illustrates the application of my invention to a transducer whose output is the unbalance of a Wheatstone bridge;

FIGURE 3 shows the application of my invention shown in FIGURE 2 to a multiple channel response system receiving a multiple signal employing the circuit in FIGURE 1.

FIGURE 4 is a modification of the circuit of FIGURE 2.

In FIGURE 1, the response circuits of the telemetering system are indicated at T, which has multiple channel inputs to receive multiple signals from a multiple single-ended source illustrated as two channels, for example, S and S'. The single-ended output terminal of S is connected to the channel $T_1$ and that of S' to the channel $T_2$ of the response circuit. $R_1$ and $R_1'$ indicate the resistance of the connecting lines for each of the channels. Assuming the polarity of the excitation voltage, for the signal sources S and S' and for the response circuit, as shown on FIGURE 1, the current demand for the response circuit is applied at $T_4$ and returned through the common terminal at $T_3$. $R_1$ and $R_1'$ indicate the resistance in the lines connecting the signal source to channels $T_1$ and $T_2$ of the response circuits T. $R_7$ indicates the input impedances and also the internal resistance of T other than the impedances of the response elements shown as $R_6$ and $R_6'$. $R_3$ indicates the impedance of the common return line from signal sources S and $S_2$. $R_5$ and $R_5'$ and $R_4$ and $R_4'$ indicate the impedances of the power lines to the signal sources S and S'.

The signal currents from S and S' are each applied to the resistors $R_2$ and $R_2'$ shunted across the input terminals of the responsive channels of the response circuit and returned via the common line ($E_2$) through the return resistor $R_8$.

When the resistance $R_1$ or $R_1'$ is small, compared with other input resistances to T, $R_2$ and $R_2'$, may be made part of the signal-generating source S and $S_2$. They may be incorporated in the signal source as indicated in FIGURES 2, 3 and 4.

It will be seen that the current for each of the resistances $R_2$ and $R_2'$ in each channel is independent of all other current paths in the circuit, and thus the voltage across each resistor $R_2$ and $R_2'$, i.e., the input voltage, at each channel, is dependent only on this current, assuming the value of $R_2$ and $R_2'$ for each channel remains constant and the voltages $E_1$–$E_2$ were also constant. In FIGURE 1 the current flowing through $R_1$ and $R_1'$ in each channel is the signal current. The current flowing through the return resistor $R_8$ is the signal current plus the generalized current demand of the response circuit T other than the signal current. The current flowing through $R_4$ and $R_5$ and $R_4'$ and $R_5'$ is the generalized current demand of the signal sources S and S' respectively. Thus, the signal currents flowing through $R_1$ and $R_1'$ are shared by $R_2$ and $R_2'$ with the resistances $R_6$ and $R_6'$.

FIGURE 2 illustrates a preferred signal source suitable for the circuit described above to produce a current isolated single-ended output signal. It is illustrated by application to a Wheatstone bridge circuit, although, as will be understood by those skilled in the art, it is applicable to any DC stimulus.

The excitation voltage $E_1$–$E_2$ is applied at the inputs 6 and 7. As an illustration of a very useful application, the signal which is to be amplified and applied to the response circuit, is shown as a resistance bridge. Thus, for example, it may be the Wheatstone bridge of a strain wire transducer of the unbonded type, for example, see U.S. Patents Nos. 2,778,624; 2,622,176; 2,453,599; 2,600,701 and 2,840,675.

The legs of the Wheatstone bridge are shown at $2a$, $2b$–$2c$, $3b$–$3c$ and $2a$. The resistor $2c$ or $3c$ may be employed in order to compensate for changes in the balance of the bridge when no stimulus is imposed on the bridge to vary the values of the resistances of the bridge. Such a change may result from expansion or contraction of various parts of the transducer as a result of temperature changes. These temperature changes may affect the resistances of the Wheatstone bridge in the same manner as if the transducer were stimulated by a condition which the transducer is designed to sense.

Thus, 2c may be a resistor whose resistance increases with increase in temperature herein referred to as a positive resistor, such as is more fully described below. The resistor 3c may be a resistor whose resistances do not change substantially with changes in temperature herein referred to as insensitive resistor.

The input corners of the bridges 2 and 3 are connected through a voltage stabilizer made up of the resistance network 9 and 8 across which is placed Zener diode 10. The input corners 2 and 3 are also shunted by the Zener diode 11 to produce a stable excitation voltage across 2 and 3. The signal is developed when the resistances of the bridge between the corners are made unequal, thus establishing a difference of potential at the corners 4 and 5. This potential is applied to the bases of the transistors 12 and 13 connected as a differential direct-coupled amplifier. The resistors 14 and 14a are common biasing resistor, and resistors 15 and 16 are the load resistor for the collectors of the transistors of 12 and 13.

The two legs of the first driver stage of amplification employing the NPN transistors 12 and 13 are symmetrically arranged. As will be understood, PNP transistors may be used with suitable changes in polarity.

An example of such positive resistor 14a is the resistor sold under the name Balco by the W. B. Driver Company understood to be comprised of 70% nickel and 30% iron. The ratio of the insensitive resistor 14 to the positive resistor is made such that the change in the total resistance with change in temperature, assuming a constant excitation and signal potential, is such as to maintain the bias at the base of the transistors 12 and 13 at those values required to maintain the collector voltage substantially constant over the operating temperature range. The bias at the base of the transistors 12 and 13 is thus changed as a function of temperature which corresponds to the changes in the base to emitter voltage (as a result of temperature change) which is required to keep a constant collector current. Since the change in the bias is a substantially linear function of the temperature, the substantial linear variation of the resistance of the resistor 14a results in a substantial variation of the bias at the base, to compensate for the change in the base to emitter bias.

The output of the transistors 12 and 13 is each applied to the bases of the complementary transistors 17 and 18, each driven by one of the balanced outputs from the collectors of the preceding stage of amplification. The complementary transistors 17 and 18 are connected as emitter followers with a common load resistor 19 connected as an inter-emitter resistor between the emitters of the complementary transistors. A negative feedback is established from the emitters of each of the complementary transistors 17 and 18 to the bases of the driver transistors through the resistances 23 and 24. The potential at 25 is the output signal and is developed on resistor 22, the lower side of which is at potential $E_2$ at 7. The resistor 22 is similar to resistor $R_1$ or $R_1'$ of FIG. 1. The output is thus single-ended at 25. The voltage at 25 is translated to reference potential through 22.

It will be seen that the potential difference established at the corners 4 and 5 by the unbalance of the bridge is nulled, while the stimulus which created the bridge unbalance is maintained by the negative feedback currents in 23 and 24. The feedback currents are in magnitude required to bring the base potential of 12 and 13 into balance. The open loop gain being sufficiently large in magnitude, gain G i.e. the ratio of the voltage across the resistor 19 divided by the open loop voltage across the bridge is thus $$G = \frac{2R_f + R_2}{R_2}$$

where $R_f$ is the resistance of each of the two equal resistances 23 and 24, and $R_2$ is the equivalent resistance of the bridge 1. Thus, the gain is independent of any load resistance connected to 25.

It is to be noted that because of the complementary nature of the transistor 17 and 18, the collector-voltage changes of transistors 12 and 13, responsive to changes in potential at 4 and 5, are added in resistance 19. The differential amplifier voltage output is established across the resistor 19, and the current in the collector-emitter circuit of the complementary transistor and through the common emitter load resistor 19 is returned to reference potential at 7 through 22 and may be metered in any way, as for example, as a potential between the single-ended output 25 and the base potential at 7.

As the potential difference at 4 and 5 varies, so will the amplifier potential applied to 19. The current flowing through 19 is thus directly proportional to the potential difference at 4 and 5, and inversely proportional to the resistance $R_{19}$, i.e., the resistance of 19. Thus, for example, the potential $e_1$ at corner 4 becomes more positive with respect to $e_2$, the potential at the corner 5 of the bridge. Point 19a at the end of the resistor 19 becomes more positive with respect to point 19b at the other end of the resistor 19. The current (I) flow through 19 will be proportional to the potential $e_1 - e_2$. The proportionality constant is the resistance of 19 multiplied by the $$(e_1 - e_2) = \frac{I \times R_{19}}{G}$$

Thus, it will be seen that the current through $R_{19}$ is proportional to $e_1 - e_2$ and is not affected by any current in the remaining circuit so long as G and $R_{19}$ are constant in value. The magnitude of this current depends only on the value of the resistance $R_{19}$ and on the equal resistances $R_f$, as described above. The current (I) is thus independent of the current through the common resistor 14 or through the driver stage, and of the bridge current in the circuit of FIGURE 2, so long as $e_1 - e_2$ remains constant. The current through 22 is isolated, i.e., it is independent of all other currents and in all other circuits in the system.

The complementary transistors 17 and 18 make it unnecessary to minimize the value of the load resistances 15 and 16 in order to avoid excessive load variations at the collectors of 13 and 12 so that the effect of temperature changes on the open loop gain of the amplifier will be minimized.

The input impedances to the complementary transistors are proportional to $R_{19}$ multiplied by $\beta$ of the transistor circuit. Thus, if A is the open loop gain, B is the feedback ratio and G the gain of the feedback system, then $$G = \frac{A}{1 - (-AB)}$$

and if $AB \gg 1$, $$G = \frac{1}{B} = \frac{2R_f + R_2}{R_2}$$

where $R_2$ is the resistance of the bridge 1. I may thus optimize the collector loads for the transistors 12 and 13 and need not minimize the load impedances 15 and 16 to avoid excessive impairment of open loop gain by increases in temperature.

If, as is illustrated in FIGURE 2, the same excitation source is used to excite the bridge and amplifier, a static current is present in 22 when the potential $e_1$ is equal to $e_2$. This is necessary to maintain the transistors 17 and 18 in a forward biased condition. Thus, a static potential is established between 25 and 7, and this constitutes an offset from which the signals are measured. The magnitude of this offset may, however, constitute but a fraction of a percent of the maximum value of $e_1 - e_2$ developed by the maximum variation in the resistances of the bridge permitted for the transducer such as are described, for example, in the patents listed above which develops the change in the resistances of the bridge. Such offset is also an index of the system's operable condition, and its absence or abnormal value is an indication of malfunction.

FIGURE 3 illustrates the use of the circuit of FIGURE 2 in the circuit of FIGURE 1, showing two channels, each of the same configuration as that of FIGURE 2, one channel having parts with unprimed numbers and the other channel having like parts with prime numbers. Parts in common to both circuits of both channels have an unprimed number. They are 6, 7, 8, 9, 10, 27 and 28.

Resistances 22 and 22′ are the resistors $R_2$ and $R_2'$ of FIGURE 1, and the resistor 28 is the resistor $R_8$ of FIGURE 1.

FIGURE 4 shows a variation of the amplifier circuit of FIGURE 3 in which the negative feedback via 23 and 24 is carried back to the emitter of the first stage which is of opposite polarity. An intermediate stage of amplification is provided by transistors 31 and 32, with the load resistors 33 and 34 causing an inversion of polarity to the emitter of the last stage at 19a and 19b compared with those of FIGURE 3. If the open loop gain A is made sufficiently great, the gain of the system may be expressed as $$G=\frac{A}{1-(-AB)}=\frac{1}{B}=\frac{1}{2}\left[\frac{R_{23}+R_{35}}{R_{35}}+\frac{R_{24}+R_{36}}{R_{36}}\right]$$

when $AB \gg 1$.

It is desirable that the transistors 12 and 13 and 31 and 32 be matched pairs and the resistance of 36, i.e., $R_{36}$ be equal to the resistance of 35, i.e., $R_{35}$ and the resistance $R_{24}$ equal to $R_{23}$.

Such an amplifier will be stable and produce a single-ended output which, like that of the system of FIGURE 3, will have an isolated output current. The differential signal applied at the bases is, unlike the case of FIGURE 2, not nulled by the feedback. The emitters of 12 and 13 are, however, brought back to substantially the same potential. This circuit may be used in place of that of FIGURE 2 in the circuits of FIGURE 1 and FIGURE 3.

It will be understood that while I have illustrated the invention as applied to a strain gage transducer, and to a resistance bridge, my invention is applicable to various forms of transducers and to various forms of bridges and amplifiers. It may be applied to bridges having reactive components if AC to DC conversion is used to develop equivalent DC signals. It may, in fact, be applied to signal sources used in telemetering or recording systems.

While I have described a particular embodiment of my invention for purposes of illustration, it should be understood that various modifications and adaptations thereof may be made within the spirit of the invention, as set forth in the appended claims.

I claim:

1. A single-ended direct-coupled differential amplifier comprising a driver stage, including a pair of symmetrically arranged transistors, the emitters of said transistors connected to a reference potential, the collectors of said transistors coupled to one each of a pair of complementary transistors connected as emitter-followers, a common load resistance connected between the emitters of said complementary transistors, a voltage translating resistance connected to one of the collectors of one of said complementary transistors, a power source for said amplifier, said common load resistor and the emitter-to-collector impedance of said complementary transistors being in series with the power source, the output current of said amplifier established in said translating resistor being dependent substantially only on the potential established across said common load resistor and independent of the current in all other current paths of said amplifier, negative feedback connections from each of said emitters of each of said complementary transistors and across said common load resistor to the bases of each of the driver transistors and a resistance in each of said feedback connections and a single ended output connection to one of the collectors of one of said complementary transistors.

2. In the amplifier of claim 1, a positive temperature coefficient resistor in said common connection in series with said emitters of said driver transistors.

3. In the amplifier of claim 2, an insensitive resistor in series with the positive temperature coefficient resistor.

4. A differential amplifier for a Wheatstone bridge circuit comprising a pair of symmetrically arranged driver transistors, the emitters of said driver transistors connected to a reference potential, the collectors of said driver transistors coupled to the base of one each of a pair of complementary transistors connected as emitter followers, a common load resistor connected between the emitters of said complementary transistors, the emitters of each of the complementary transistors connected through a resistor to the base of the driver transistor whose collector is connected to the base of said complementary transistors, a Wheatstone bridge, the output corners of said Wheatstone bridge connected to the bases of the driver transistors.

5. In the amplifier of claim 4, a positive temperature coefficient resistor in said common connection to the transistors of said driver transistors.

6. In the amplifier of claim 5, an insensitive resistor in series with said positive temperature coefficient resistor.

7. In the amplifier of claim 4, a voltage translating resistance connected to one of the collectors of said complementary transistors, a power source for said amplifier, said common load resistor and the emitter to collector impedance of said complementary transistor being in series with said power source.

8. In the amplifier of claim 5, a voltage translating resistor connected to one of the collectors of said complementary transistors, a power source for said amplifier, said common load resistor and the emitter to collector impedance of said complementary transistors being in series with the power source.

References Cited

UNITED STATES PATENTS

| | | | |
|---|---|---|---|
| 2,965,850 | 12/1960 | Jameson | 330—69 X |
| 3,046,487 | 7/1962 | Matzen et al. | |
| 3,148,339 | 9/1964 | Bell et al. | 330—69 |
| 3,185,932 | 5/1965 | Walker et al. | 330—17 X |
| 3,195,018 | 7/1965 | Giger. | |
| 3,253,140 | 5/1966 | Sibley et al. | 330—26 XR |

OTHER REFERENCES

Army Technical Manual, TM11–690, March 1959, U.S. Government Printing Office, pp. 109–111 relied on.

ROY LAKE, *Primary Examiner.*

F. D. PARIS, *Assistant Examiner.*